US007813017B2

(12) United States Patent
Ihas et al.

(10) Patent No.: US 7,813,017 B2
(45) Date of Patent: Oct. 12, 2010

(54) METHOD AND SYSTEM FOR INCREASING HOLOGRAPHIC DATA STORAGE CAPACITY USING IRRADIANCE-TAILORING ELEMENT

(75) Inventors: Benjamin C. Ihas, Superior, CO (US); Samuel Paul Weaver, Boulder, CO (US); Ken E. Anderson, Boulder, CO (US); Aaron Wegner, Longmont, CO (US)

(73) Assignee: InPhase Technologies, Inc., Longmont, CO (US)

( * ) Notice: Subject to any disclaimer, the term of this patent is extended or adjusted under 35 U.S.C. 154(b) by 317 days.

(21) Appl. No.: 11/319,425

(22) Filed: Dec. 29, 2005

(65) Prior Publication Data
US 2007/0091399 A1 Apr. 26, 2007

Related U.S. Application Data

(60) Provisional application No. 60/728,768, filed on Oct. 21, 2005.

(51) Int. Cl.
*G03H 1/28* (2006.01)
(52) U.S. Cl. .......................................... 359/24; 359/30
(58) Field of Classification Search .................. 359/489
See application file for complete search history.

(56) References Cited

U.S. PATENT DOCUMENTS

| 3,232,198 | A | * | 2/1966 | Van Breemen ............... 396/479 |
| 3,744,871 | A | | 7/1973 | Takeda et al. |
| 3,829,193 | A | | 8/1974 | Tsunoda et al. |
| 3,854,791 | A | | 12/1974 | Takeda et al. |
| 3,917,380 | A | | 11/1975 | Kato et al. |
| 4,037,918 | A | | 7/1977 | Kato |
| 4,143,937 | A | | 3/1979 | Yonezawa et al. |
| 4,783,133 | A | * | 11/1988 | Chen ............................. 359/23 |
| 5,058,124 | A | | 10/1991 | Cameron et al. |
| 5,071,207 | A | * | 12/1991 | Ceglio et al. ................... 359/15 |
| 5,510,912 | A | | 4/1996 | Blaum et al. |
| 5,627,664 | A | | 5/1997 | Trisnadi |
| 5,727,226 | A | | 3/1998 | Blaum et al. |
| 6,018,402 | A | | 1/2000 | Campbell et al. |

(Continued)

FOREIGN PATENT DOCUMENTS

WO    WO 9944195 A1 *  9/1999

OTHER PUBLICATIONS

Psaltis et al., "Holographic Memories," *Scientific American*, Nov. 1995.

(Continued)

*Primary Examiner*—Stephone B Allen
*Assistant Examiner*—Derek S Chapel
(74) *Attorney, Agent, or Firm*—Vedder Price P.C.; Ajay A. Jagtiani

(57) ABSTRACT

A method and system is disclosed for increasing the holographic storage capacity of a holographic recording medium using an irradiance-tailoring (e.g., optical) element by changing the irradiance profile of the modulated object beam (e.g., by imparting motion to an irradiance-tailoring element and/or the holographic recording medium and/or by reconfiguring (e.g., periodically) the phase profile of a stationary irradiance-tailoring (e.g., optical) element) to minimize the effects of fixed-pattern noise buildup from occurring in the holographic recording medium.

44 Claims, 6 Drawing Sheets

U.S. PATENT DOCUMENTS

| | | | |
|---|---|---|---|
| 6,047,008 | A | 4/2000 | Funakawa |
| 6,103,454 | A | 8/2000 | Dhar et al. |
| 6,163,391 | A | 12/2000 | Curtis et al. |
| 6,281,993 | B1 | 8/2001 | Bernal et al. |
| 6,310,850 | B1 | 10/2001 | Sochava et al. |
| 6,414,763 | B1 | 7/2002 | Hesselink et al. |
| 6,449,627 | B1 | 9/2002 | Baer et al. |
| 6,482,551 | B1 | 11/2002 | Dhar et al. |
| 6,614,566 | B1 | 9/2003 | Curtis et al. |
| 6,650,447 | B2 | 11/2003 | Curtis et al. |
| 6,674,555 | B1 | 1/2004 | Curtis et al. |
| 6,697,180 | B1 | 2/2004 | Wilson et al. |
| 6,700,686 | B2 | 3/2004 | King et al. |
| 6,721,076 | B2 | 4/2004 | King et al. |
| 6,743,552 | B2 | 6/2004 | Setthachayanon et al. |
| 6,765,061 | B2 | 7/2004 | Dhar et al. |
| 6,780,546 | B2 | 8/2004 | Trentler et al. |
| 6,798,547 | B2 | 9/2004 | Wilson et al. |
| 6,856,461 | B2 | 2/2005 | Curtis et al. |
| 7,092,133 | B2 | 8/2006 | Anderson et al. |
| 7,130,092 | B1 * | 10/2006 | Horimai .................... 359/35 |
| 2002/0110053 | A1 | 8/2002 | Araki et al. |
| 2003/0206320 | A1 | 11/2003 | Cole et al. |
| 2004/0027625 | A1 | 2/2004 | Trentler et al. |
| 2005/0068880 | A1 | 3/2005 | Hibino |

OTHER PUBLICATIONS

Smothers et al., "Photopolymers for Holography," *SPIE OE/Laser Conference*, (Los Angeles, Calif., 1990), pp. 1212-1303.

L. Dhar et al., "Recording Media That Exhibit High Dynamic Range for Holographic Storage," *Optics Letters*, 24, (1999): pp. 487 et seq. seq.

Psaltis et al., "*Holographic Data Storage*" (2000).

G. Esaev, "Continuous Random Phase Mask," *Sov. Phys. Tech. Phys.*, 1977, 9, 1150-52.

A. Iwamoto, "Artificial Diffuser for Fourier Transform Hologram recording," *Appl. Optics*, 1980, 19, 215-20.

M.P. Bernal et al., "Effects of Multilevel Phase Masks on Interpixel Cross Talk in Digital Holographic Storage," *Appl. Optics*, vol. 36 (No. 14) (May 1997), pp. 3107-3115.

Y. Nakayama et al., "Diffuser with Pseudorandom Phase Sequence," *Opt. Soc. Am.*, vol. 69 (No. 10), (Oct. 1979), pp. 1367-1372.

Y. Tsunoda et al., "High Density Image-Storage Holograms by a Random Phase Sampling Method," *Appl. Optics*, vol. 13 (No. 9) (Sep. 1974), pp. 2046-2051.

R. Brauer et al., "Diffusers in Digital Holography," *J. Opt. Soc. Am.*, vol. 8 (No. 3), (Mar. 1991), pp. 572-578.

Q. Gao et al., "Improvement to Holographic Digital Data-Storage Systems with Random and Pseudorandom Phase Masks," *Appl. Optics*, vol. 36 (No. 20) (Jul. 1997), pp. 4853-4861.

J. Yang et al., "Improving Holographic Data Storage by Use of an Optimized Phase Mask," *Appl. Optics*, vol. 38 (No. 26) (Sep. 1999), pp. 5641-5645.

C. Burckhardt, "Use of a Random Phase Mask for the Recording of Fourier Transform Holograms of Data Masks," *Appl. Optics*, vol. 9 (No. 3) (Mar. 1970), pp. 695-700.

PCT/US2007/06094 International Search Report and the Written Opinion of the International Searching Authority, or the Declaration, mailed Aug. 22, 2008.

PCT/US2006/19906 International Search Report and the Written Opinion of the International Searching Authority, or the Declaration, mailed Sep. 16, 2008.

* cited by examiner

METHOD AND SYSTEM FOR INCREASING HOLOGRAPHIC DATA STORAGE CAPACITY USING IRRADIANCE-TAILORING ELEMENT

CROSS-REFERENCE TO RELATED APPLICATIONS

This application makes reference to and claims the benefit of the following U.S. Provisional Patent Application No. 60/728,768 filed Oct. 21, 2005. The entire disclosure and contents of the foregoing Provisional Application is hereby incorporated by reference.

GOVERNMENT INTEREST STATEMENT

The United States Government has rights in this invention pursuant to Award/Contract No. 70NANB3H3031 between InPhase Technologies and the National Institute of Science & Technology (NIST).

BACKGROUND

1. Field of the Invention

The present invention relates generally to a method and system for increasing the holographic storage capacity of a holographic recording medium using an irradiance-tailoring element by changing the irradiance profile of the modulated data beam to thereby minimize the effects of fixed-pattern noise buildup from occurring in a holographic recording medium. The present invention further relates generally to a method and system for changing the irradiance profile of a relayed modulated data beam to thereby minimize the effects of fixed-pattern noise buildup in the holographic recording medium 2. Related Art Developers of information storage devices and methods continue to seek increased storage capacity. As part of this development, page-wise memory systems, in particular holographic systems, have been suggested as alternatives to conventional memory devices. Holographic systems typically involve the storage and readout of entire pages of information, these pages consisting of arrayed patterns representing information. In general, a holographic system stores, in three dimensions, holographic representations of the pages as patterns of varying refractive index and/or absorption imprinted into a storage medium.

Holographic systems are characterized by their high density storage potential and the potential speed at which the stored information is randomly accessed and retrieved. In fact, because information is typically manipulated, i.e., stored and retrieved, on a page-by-page basis, the speed of storage and retrieval compares favorably to conventional magnetic disk or compact disk storage systems. A significant advantage of holographic systems, however, is storage capacity. It is possible for each page stored as a holographic image to contain thousands or even millions of elements. Theoretically, it is believed that at the present time, up to $10^{14}$ bits of information are storable in approximately $1.0$ $cm^3$ of holographic storage medium.

The page-wise systems of holographic systems involve the storage and readout of an entire two-dimensional representation, e.g., a page of data Typically, recording light passes through a two-dimensional array of dark and transparent areas representing data, and the holographic system stores, in three dimensions, holographic representations of the pages as patterns of varying refractive index imprinted into a storage medium. Holographic systems are discussed generally in Psaltis et al., "Holographic Memories," *Scientific American*, November 1995.

The capabilities of typical holographic recording systems are determined in part by the storage medium. One type of holographic recording media used recently for such systems are photosensitive polymer films. See, e.g., Smothers et al., "Photopolymers for Holography," *SPIE OE/Laser Conference*, (Los Angeles, Calif., 1990), pp. 1212-03. The holographic recording media described in Smothers et al., supra contain a photoimageable system containing a liquid monomer material (the photoactive monomer) and a photoinitiator (which promotes the polymerization of the monomer upon exposure to light), where the photoimageable system is in an organic polymer host matrix that is substantially inert to the exposure light. During writing (recording) of information into the material (by passing recording light through an array representing data), the monomer polymerizes in the exposed regions. Due to the lowering of the monomer concentration caused by the polymerization, monomer from the dark, unexposed regions of the material diffuses to the exposed regions. The polymerization and resulting diffusion create a refractive index change, thus forming the holographic grating (hologram) representing the data.

Photosensitive polymer films are considered attractive recording media candidates for high density holographic data storage. These films have a relatively low cost, are easily processed and can be designed to have large index contrasts with high photosensitivity. These films can also be fabricated with the dynamic range, media thickness, optical quality and dimensional stability required for high density applications. See L. Dhar et al., "Recording Media That Exhibit High Dynamic Range for Holographic Storage," *Optics Letters*, 24, (1999): pp. 487 et seq. seq.

A technique for increasing data storage capacity is multiplexing holograms. Multiplexing holograms involves storing multiple holograms in a media, often in the same volume or nearly the same volume of the media. Typically, this is carried out by varying an angle, wavelength, phase code, or some other system parameter in the recording and readout setup of the holograms. Many of these methods rely on a holographic phenomenon known as the Bragg effect to separate the holograms even though they are physically located within the same volume of media. Other multiplexing methods such as shift and, to some extent correlation, use the Bragg effect and relative motion of the media and input laser beams to overlap multiple holograms in the same volume of the media.

At least two fundamental factors typically govern the amount of data that can be holographically stored in a given volume of the holographic recording medium. First, the volume of the holographic recording medium required for the data and reference signal beams to interfere determines the number of discrete optical recording sectors allowed across the surface of a given area of the medium. Second, the number of data images that can be stored in a single volumetric sector of the holographic recording medium determines the local density of the data. Thus, in order to maximize the data capacity for any volumetric sector of the holographic recording medium, the combined volume of the object and reference beams should be minimized while the number of holograms is maximized.

One method available to reduce the volume of the holographic recording medium exposed during recording is to use a strong lens (e.g. Fourier Transform lens) to focus the modulated data beam into the center of the thickness or volume of the recording medium. This method enables equal and minimally sized irradiance profiles to be incident upon both surfaces of the medium. The undesired side-effect of using a focused beam centered in the volume of the holographic recording medium is that local areas of extremely high energy irradiance are created, which in turn over-expose and distort the recording medium, to the detriment of high-fidelity holographic recording. Such strong intensity or irradiance concentrations, the most detrimental of which are often localized along the center of the focused beam, have particularly negative implications for holographic recording approaches that multiplex many holograms in the same spatial location, such as angular multiplexing or correlation multiplexing.

Methods exist to mitigate these undesired effects that occur as a result of focusing the object beam into the center of the volume of the holographic recording medium. These methods include shift multiplexing, reducing the number of multiplexed holograms, reducing the energy in the data beam, or using a stationary or fixed "phase mask" to minimize the coherent addition of pixels at the Fourier plane of the focused data beam. See, for example, U.S. Pat. No. 5,510,912 (Blaum et al.), issued Apr. 23, 1996, and U.S. Pat. No. 5,727,226 (Blaum et al.), issued Mar. 10, 1998, which use stationary or fixed "phase masks." All of these methods may negatively and dramatically impact the available storage capacity of the holographic recording medium.

What may be the most dramatic example of a non-uniform irradiance distribution occurs when a holographic storage system uses an amplitude (data) modulator to modulate data onto the optical beam, with the hologram then being recorded in the Fourier plane of the modulator. A Fourier plane recording occurs when there is a lens that focuses the information from the data modulator into the recording medium. In this particular instance, every pixel adds coherently at the very center of the Fourier distribution, thus often leading to what is commonly referred to as a "Direct Current (DC) hot spot." The irradiance (intensity) of this DC hot spot may be as much as six orders of magnitude higher than the surrounding data. The focused portion of the data beam, known as the beam waist, represents the smallest area of the focused beam that may be achieved, and is therefore the data beam location where the highest bit density often occurs. The focal length of the lens and the pixel size determine the smallest area of the focused beam that may be achieved, as defined by the equation $D=2\pi\lambda f/\Delta$, where D is the diameter of the beam waist at the focus, $\lambda$ is the wavelength of the beam, f is the focal length of the lens, and $\Delta$ is the pixel diameter.

There have been very few methods developed to decrease this DC hot spot effect. The most common method uses a "phase mask" on the modulator that scrambles the phase of the pixels so that they do not constructively add at the center of the Fourier plane. Common variations of a phase mask may include binary pixel matched phase masks, multilevel pixel matched phase masks, and axicons. See Psaltis et al., *Holographic Data Storage* (2000), for a summary of research on these types of phase masks. Because of the difficulty in aligning a pixel matched phase mask to an amplitude (data) modulator, the practicality of using such a phase mask is questionable.

Another approach uses a phase shifting element composed of "linear variations" to provide a non-pixel matched solution to this problem. See U.S. Pat. No. 6,281,993 (Bernal et al.), issued Aug. 28, 2001. This phase shifting element includes an axicon or a "phase shifting device that consists of a plurality of prismatic elements. These prismatic elements have linear features, and as such, these elements contain discontinuities. These discontinuities are difficult to manufacture and may also result in a potential loss of data when the discontinuity occurs in the middle of a pixel. Where an axicon is used, there is only one discontinuity, minimizing the effect. Instead, the axicon causes the DC component of the irradiance profile to become donut shaped, which is not an ideal way to smooth the irradiance profile in the focus plane.

Continuous random phase masks disclosed in D. G. Esaev, Continuous Random Phase Mask," *Sov. Phys. Tech. Phys.*, 1977, 9, 1150-1152, involving continuous random phase pixels may accomplish smoothing of the irradiance profile in the focus plane. See also A. Iwamoto, "Artificial Diffuser for Fourier Transform Hologram recording, " *Appl. Optics*, 1980, 19, 215-220, which discloses a phase mask of random pixels but where the phase variation is of a higher spatial frequency (features smaller than the pixels) than the data pixels and where the phase variation is continuous and smooth rather than having discrete steps. However, the phase pixels in both these masks have the same alignment, registration and interference difficulties as the two and multiple level masks.

Continuously varying phase masks may be used in a holographic data storage system to create a similar effect to that of pixel matched phase masks without the strict alignment requirement, and enabling imaging onto the data modulator without the need to match pixels. However, one detrimental effect in using these phase masks in holographic recording is that, for a fixed position of the phase mask location, the irradiance profile of the beam passing through the phase mask still has a constant pattern, even though the irradiance profile of the data modulator is relatively random. When relayed or focused into holographic media with a lens (or lenses), a patterned irradiance distribution may build up an index profile in the media because the media is inherently sensitive to variations in irradiance. This buildup may lead to non-uniformities, scatter, media distortions, and other detrimental effects.

These detrimental irradiance concentration effects also vary depending on the optical characteristics of the holographic recording system, such as the aberrations present in the optical system, aberrations induced by the incident angle between the recording beams and the recording medium, and intensity non-uniformities in the illumination beams. The precise irradiance profiles may also vary based on system design, but the repeated exposure of any static irradiance profile, even when the data beam is modulated, will build up a refractive index profile which is the autocorrelation of the static irradiance profile. This undesired refractive index profile ultimately results in the degradation of the recording fidelity of the medium.

Accordingly, it would be desirable to provide a holographic recording method and/or system that is able to: (1) minimize the recording medium volume required for the object and reference beams to interfere; (2) maximize the data capacity in any volumetric sector of the recording medium; (3) avoid or minimize over-exposure, distortion and other detrimental effects in the holographic recording medium, even when multiplexing many holograms in the same spatial location; (4) maintain a close ratio in power density between the object and reference beams; and/or (5) minimize the alignment tolerance issues of phase masks.

SUMMARY

According to a first broad aspect of the present invention, there is provided a method comprising (1) providing a modulated data beam having an irradiance profile; and;

(2) changing the irradiance profile of the modulated data beam to thereby minimize the effects of fixed-pattern noise buildup from occurring in a holographic recording medium.

According to a second broad aspect of the present invention, there is provided a method comprising:
(1) contacting an object beam with an irradiance-tailoring element and a data modulator to thereby provide a modulated data beam having an irradiance profile;
(2) relaying the modulated data beam so as to interfere with a reference beam to thereby form at least one hologram in a holographic recording medium; and
(3) changing the irradiance profile of the relayed modulated data beam after forming the at least one hologram to thereby minimize the effects of fixed-pattern noise buildup from occurring in the holographic recording medium.

According to a third broad aspect of the present invention, there is provided a system comprising:
an irradiance-tailoring element;
a data modulator;
an object beam contacting the irradiance-tailoring element and the data modulator to provide a modulated data beam having an irradiance profile; and
means for changing the irradiance profile of the modulated data beam to thereby minimize the effects of fixed-pattern noise buildup from occurring in a holographic recording medium.

According to a fourth broad aspect of the present invention, there is provided a holographic recording system comprising:
an irradiance-tailoring element;
a data modulator;
an object beam contacting the irradiance-tailoring element and the data modulator to provide a modulated data beam having an irradiance profile;
a holographic recording medium;
means for relaying the modulated beam so as to interfere with a reference beam to thereby form at least one hologram in the holographic recording medium; and
means for changing the irradiance profile of the relayed data beam after forming the at least one hologram to thereby minimize the effects of fixed-pattern noise buildup from occurring in the holographic recording medium.

BRIEF DESCRIPTION OF THE DRAWINGS

The invention will be described in conjunction with the accompanying drawings, in which.

DETAILED DESCRIPTION

Figure 1:
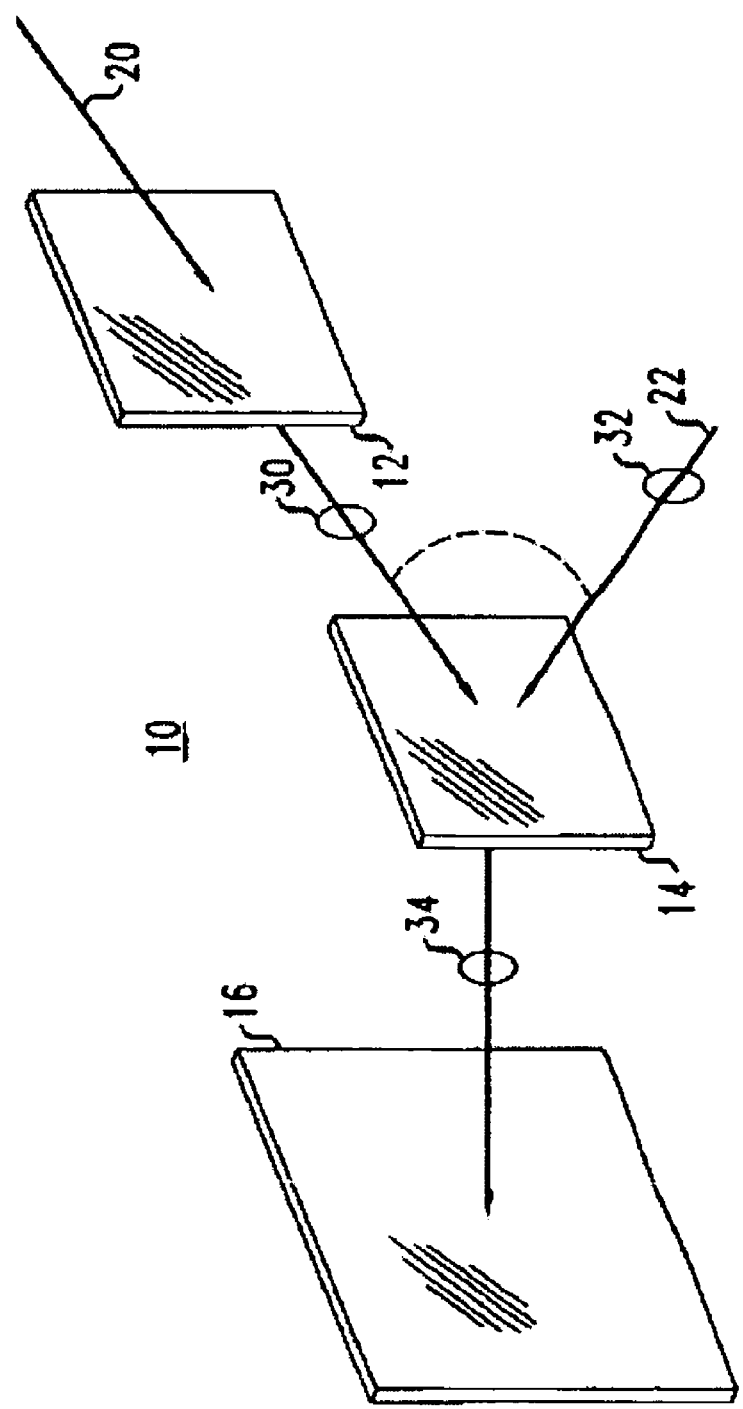
FIG. 1 shows a basic holographic storage system for recording holograms in a holographic recording medium.

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, the term "light source" refers to any source of electromagnetic radiation of any wavelength, for example, from a laser, etc. Suitable light sources for use in embodiments of the methods and systems of the present invention include, but are not limited to, those obtained by conventional laser sources, e.g., the blue and green lines of $Ar^+$ (458, 488, 514 nm) and He—Cd lasers (442 nm), the green line of frequency doubled YAG lasers (532 nm), and the red lines of He—Ne (633 nm), $Kr^+$ lasers (647 and 676 nm), and various diode lasers (290 to 900 nm).

For the purposes of the present invention, the term "photoinitiating light source" refers to a light source that activates a photoinitiator, a photoactive polymerizable material, or both, in a holographic recording medium to cause a holographic recording in the medium. Photoiniating light sources include recording light, etc.

For the purposes of the present invention, the term "spatial light intensity" refers to a light intensity distribution or pattern of varying light intensity within a given volume of space.

For the purposes of the present invention, the terms "holographic grating," "holograph" or "hologram" (collectively and interchangeably referred to hereafter as "hologram") are used in the conventional sense of referring to an interference pattern formed when a signal beam and a reference beam interfere with each other. In cases wherein digital data is recorded, the signal beam may be encoded with a data modulator, e.g., a spatial light modulator, etc.

For the purposes of the present invention, the term "holographic recording" refers to the act of recording a hologram in a holographic recording medium.

For the purposes of the present invention, the term "multiplexing holograms" refers to recording, storing, etc., a plurality of holograms in the same volume or nearly the same volume of the holographic recording medium by varying a recording parameter(s) including, but not limited to, angle, wavelength, phase code, shift, correlation, peristrophic, etc. The multiplexed holograms that are recorded, stored, etc., may be read, retrieved, etc., by using the same recording parameter(s) used to record, store, etc., the respective holograms.

For the purposes of the present invention, the term "holographic recording medium" refers to a component, material, etc., that is capable of recording and storing, in three dimensions (i.e., the X, Y and Z dimensions), one or more holograms as one or more pages as patterns of varying refractive index imprinted into the medium. Examples of holographic recording media useful in embodiments of the methods and systems of the present invention include, but are not limited to, those described in: U.S. Pat. No. 6,103,454 (Dhar et al.), issued Aug. 15, 2000; U.S. Pat. No. 6,482,551 (Dhar et al.), issued Nov. 19, 2002; U.S. Pat. No. 6,650,447 (Curtis et al.), issued Nov. 18, 2003, U.S. Pat. No. 6,743,552 (Setthachayanon et al.), issued Jun. 1, 2004; U.S. Pat. No. 6,765,061 (Dhar et al.), Jul. 20, 2004; U.S. Pat. No. 6,780,546 (Trentler et al.), issued Aug. 24, 2004; U.S. Patent Application No. 2003-0206320, published Nov. 6, 2003, (Cole et al), and U.S. Patent Application No. 2004-0027625, published Feb. 12, 2004, the entire contents and disclosures of which are herein incorporated by reference.

For the purposes of the present invention, the term "data page" or "page" refers to the conventional meaning of data page as used with respect to holography. For example, a data page may be a page of data (i.e., two-dimensional assembly of data), one or more pictures, etc., to be recorded in a holographic recording medium.

For the purposes of the present invention, the term "recording light" refers to a light source used to record into a holographic recording medium. The spatial light intensity pattern of the recording light is what is recorded.

For the purposes of the present invention, the term "recording data" refers to storing holographic representations of one or more pages as patterns of varying refractive index.

For the purposes of the present invention, the term "reading data" refers to retrieving or recovering data stored as holographic representations.

For the purposes of the present invention, the term "data modulator" refers to any device that is capable of optically representing data in one or two-dimensions from a signal beam.

For the purposes of the present invention, the term "spatial light modulator" refers to a data modulator device that is an electronically controlled, active optical element.

For the purposes of the present invention, the term "irradiance profile" refers to a two-dimensional (X, Y) mapping of the power density of light. As used herein, the term "irradiance profile" is synonymous and interchangeable with the term "irradiance concentration."

For the purposes of the present invention, the term "high energy irradiance" refers to a localized irradiance of light of particularly high intensity.

For the purposes of the present invention, the term "static irradiance profile" refers to an irradiance profile that does not change over time.

For the purposes of the present invention, the term "refractive index profile" refers to a two-dimensional (X, Y) mapping of the refractive index pattern recorded in a holographic recording medium.

For the purposes of the present invention, the term "object beam" refers to a recording beam containing a data signal. As used herein, the term "data modulated beam" refers to an "object beam" that has been modulated by a modulator such as a spatial light modulator (SLM).

For the purposes of the present invention, the terms "contact" and "contacting" refer to any manner in which the object beam touches an element, for example, an irradiance-tailoring element, a data modulator, a lens, etc. The terms contact/contacting include, but are not limited to the terms illuminate/illuminating, pass/passing, reflect/reflecting, etc.

For the purposes of the present invention, the terms "relay," "relayed" and similar terms refer to any optical element, or combination of optical elements, that transfer (e.g., transmit, reflect, etc.) the object beam from a data modulator towards the holographic recording medium. Relaying devices include, but are not limited to a lens (or lenses) that focuses the data beam towards (e.g., into or proximate to the center of) the holographic recording medium, a lens (or lenses) that images the data beam towards (e.g., into or proximate the center of) the holographic recording medium, a lens (or lenses) that magnifies or demagnifies the image of the data beam towards (e.g., into or proximate the center of) the holographic recording medium, etc.

For the purposes of the present invention, the term "focused data beam" refers to an object beam that is focused by a lens or lenses (e.g., a Fourier Transform lens) to converge the beam and reduce the size of the recording volume of the beam.

For the purposes of the present invention, the term "focal point" refers to the point where the focused data beam converges to its narrowest area (commonly known as the "beam waist"). When recording a hologram, the focal point may occur before, onto, into, or after the holographic recording medium.

For the purposes of the present invention, the term "optical element" refers to any component or plurality of components that affect the phase of the light, including, but not limited to, the spatial location of the light, the angle of the light, etc.

For the purposes of the present invention, the term "reflective optical element" refers to an optical element that reflects incident light.

For the purposes of the present invention, the term "transmissive optical element" refers to an optical element that allows incident light to pass therethrough.

For the purposes of the present invention, the term "irradiance-tailoring" refers to any method, system, element, etc., or combination thereof that alters the irradiance profile of light, including, but not limited to, caustic shaping, spatial changes in the caustic, changing the intensity pattern of the caustic, etc.

For the purposes of the present invention, the term "irradiance-tailoring benefits" refers to beneficial results, output, etc., obtained by altering the irradiance profile of light, including, but not limited to, minimizing the effects fixed-pattern noise buildup (e.g., fixed-pattern autocorrelations) from occurring in a holographic recording medium.

For the purposes of the present invention, the term "irradiance-tailoring element" refers to any element (e.g., optical element, etc.) that alters the irradiance profile of the light at any point downstream of the element, for example, a caustic-shaping optic element, a holographic optical element, a phase mask, a phase modulator, etc. The irradiance-tailoring element may also comprise random non-linear features that are larger than a pixel of the data modulator onto which the data beam is imaged, and having relatively smoother features compared to prismatic elements with minimal or no discontinuities (compared to prismatic elements having linear features disclosed in U.S. Pat. No. 6,281,993 (Bernal et al.), issued Aug. 28, 2001) so that the element does not require alignment of any feature relative to any pixels on the data modulator.

For the purposes of the present invention, the term "caustic" refers to the enveloping surface formed by light rays refracting from a curved surface (e.g., of the optical element).

For the purposes of the present invention, the term "caustic shaping" refers to the act of altering the properties (e.g., width, length, intensity distribution or mapping, etc.) of the caustic of a focused beam.

For the purposes of the present invention, the term "caustic-shaping optical element" refers to an optical element that alters the properties of the caustic of a focused beam.

For the purposes of the present invention, the terms "reconfigurable" and "reconfigure" refer to the ability of an element (e.g., optical element, etc.) to actively alter its irradiance (e.g., caustic)-tailoring pattern.

For the purposes of the present invention, the term "periodically reconfigurable" refers to the ability to actively alter the irradiance (e.g., caustic)-tailoring pattern over time.

For the purposes of the present invention, the term "reconfigurable irradiance-tailoring element" refers to an element (e.g., optical element, etc.) that possesses the ability to actively alter its irradiance (e.g., caustic)-tailoring pattern.

For the purposes of the present invention, the term "periodically reconfigurable irradiance-tailoring element" refers to an element (e.g., optical element, etc.) that possesses the ability to actively alter its irradiance (e.g., caustic)-tailoring pattern over time.

For the purposes of the present invention, the term "altering the phase profile of a stationary element" refers to the ability to change the refractive index pattern of an element (e.g., optical element, etc.), without physically moving the element.

For the purposes of the present invention, the term "changing the irradiance profile" means actively changing the irradiance profile one or more times, e.g., other than by just using a fixed or stationary phase mask, and other than solely by using a data modulator. The irradiance profile may be changed by imparting motion (e.g., at irregular intervals, periodic intervals, continuously, etc.) to the irradiance-tailoring element and/or the holographic recording medium, by reconfiguring (e.g., at irregular or periodic intervals) the phase profile of a stationary irradiance-tailoring element, etc., or any combination thereof. In some embodiments of the method and system of the present invention, the irradiance profile may be changed a plurality of times, may be changed at irregular or sporadic intervals, at regular or periodic intervals, continuously, etc., or any combination thereof. The irradiance profile may be changed prior to recording a hologram, during the recording of a hologram, between the recording of a plurality of holograms, etc.

For the purposes of the present invention, the term "noise" refers to any undesirable optical signal that may cause a loss in the desired fidelity of the signal, including, but not limited to, fixed pattern autocorrelation noise, noise induced from media index distortions that are a response from the irregular irradiance distribution, noise induced by an increase in scatter due to the recording medium's index response, etc.

For the purposes of the present invention, the terms "self-correlation" and "autocorrection" refer to a shared or common irradiance-profile of otherwise separate, discrete holograms resulting from a shared or common source effect (e.g., irradiance profile, etc.).

For the purposes of the present invention, the term "fixed-pattern autocorrelation" refers to an autocorrelation resulting from an irradiance-tailoring (e.g., optical) element for which the irradiance-tailoring pattern does not change over time.

For the purposes of the present invention, the term "effects of fixed-pattern noise buildup" refers to the accumulation of, accrual of, increase of, etc., of fixed-pattern noise effects over time, including, but not limited to, media distortions, fixed-pattern autocorrelations, etc.

For the purposes of the present invention, the term "minimizes the effects of fixed-pattern noise buildup" means that these fixed-pattern noise buildup effects (e.g., fixed-pattern autocorrelations) are reduced, decreased, lessened, diminished, lowered, attenuated, curtailed, eliminated, eradicated, etc.

For the purposes of the present invention, the term "spatial optical phase profile" refers to an irradiance-tailoring pattern unique to a particular or specific irradiance-tailoring element.

For the purposes of the present invention, the term "motion" with reference to the irradiance-tailoring (e.g., optical) element and/or holographic recording medium refers to linear motion (e.g., one dimensional linear translation), rotational motion (e.g., in an arc, circle, oval, etc.) orthogonal to the optical axis (i.e., the axis along, or parallel to, the path of the light) that may be continuous, may include pauses when recording hologram, may include pauses between recordings of holograms, may be at irregular or sporadic intervals, may be at regular or periodic intervals, etc., or any combination thereof. The amount of motion imparted may depend on the particular irradiance-tailoring element used, the number of holograms recorded, the type of holographic recording medium used, the intensity of object/reference beams, etc., and may be a slight movement, e.g., on the order of microns.

For the purposes of the present invention, the term "phase-conjugate configuration" refers to a holographic data storage system design wherein a hologram is read out in such a way or manner that the read-out signal back-propagates through part or all of the optical elements that condition the object beam.

For the purposes of the present invention, the term "holographic optical element" (HOE) refers to an element that functions by diffracting light from a generalized holographic grating structure.

For the purposes of the present invention, the term "data fidelity" refers to the quality of the stored data and often the ability to effectively and accurately recover the stored data.

Description

The present invention is directed broadly at embodiments of a method and system for increasing holographic storage capacity of a holographic recording medium, while avoiding or minimizing over-exposure, distortion and other detrimental effects in the holographic recording medium, even when multiplexing many holograms in the same spatial location or volume. Even when irradiance-tailoring (e.g., caustic-shaping) elements are used to alter the irradiance pattern of the object beam, it has been discovered that the effects of fixed-pattern noise buildup (e.g., media distortions, fixed-pattern autocorrelations, etc.) may occur from undesired irradiance or intensity concentrations in the object beam (e.g., by focusing the object beam on the thickness center of the holographic recording medium) Given a sufficient number of holograms, this irradiance or intensity autocorrelation will give rise to a fixed pattern in the index of refraction that accumulates and can destroy the signal to noise ratio for each hologram. Regardless of the multiplexing technique (angle, spatial shift, peristrophic, etc.) used, these irradiance concentrations will accumulate as the number of recorded holograms increases, and eventually the quality of all recorded holograms may be compromised and degraded.

Embodiments of the method and system of the present invention are based on the further discovery that these detrimental irradiance or intensity autocorrelation and irradiance concentration accumulation effects can be avoided or minimized by changing the irradiance profile of the modulated object beam, for example, by: (1) imparting motion to the irradiance-tailoring (e.g., optical) element and/or the holographic recording medium; or (2) changing or reconfiguring (e.g., periodically) the phase profile or irradiance pattern of a stationary or fixed irradiance-tailoring (e.g., optical) element to cause a dynamic irradiance-tailoring effect by the element. Through the use, for example, of motion imparted to the irradiance-tailoring (e.g., optical) element and/or the holographic recording medium, or reconfiguring (e.g., periodically) the phase profile/irradiance pattern of the element, a data-modulated beam may be successfully focused, for example, onto or into a holographic recording medium so that the impacts of any undesired irradiance concentrations are greatly minimized, reduced or avoided. Embodiments of the method and system of the present invention that change the irradiance profile of the modulated data beam, for example, by imparting motion to the irradiance-tailoring (e.g., optical) element and/or holographic recording medium, or using a stationary irradiance-tailoring (e.g., optical) element that has its phase profile reconfigured (e.g., periodically), may dramatically reduce the auto-correlation of the static irradiance profile, thereby greatly improving the data fidelity of the recorded holograms. Embodiments of the method and system of the present invention may also be employed in a variety of configurations appropriate for any number of holographic recording method or system designs.

FIG. 1 illustrates the basic components of a holographic system 10 for recording such holograms in a holographic recording medium. System 10 contains a data modulating device 12, a photorecording medium 14, and a sensor 16. Device 12 is typically a spatial light modulator that is attached to an encoding unit. Based on the encoding, device 12 selectively passes or blocks portions of a signal beam 20 passing through device 12. In this manner, beam 20 is encoded with a data image. The image is stored by interference of the encoded signal beam 20 with a reference beam 22 at a location on or within photorecording medium 14. The interference creates an interference pattern (or hologram) that is captured within medium 14 as a pattern of, for example, varying refractive index. It is possible for more than one holographic image to be stored at a single location, or for holograms to be stored in overlapping positions (e.g., multiplexing), by, for example, varying the angle, the wavelength, or the phase of the reference beam 22, depending on the particular reference beam employed. Signal beam 20 typically passes through lens 30 before being intersected with reference beam 22 in medium 14. It is possible for reference beam 22 to pass through lens 32 before this intersection. Once data is stored in medium 14, it is possible to retrieve the data by intersecting reference beam 22 with medium 14 at the same location and at the same angle, wavelength, or phase at which reference beam 22 was directed during storage of the data. The reconstructed data passes through lens 34 and is detected by sensor 16. Sensor 16 is, for example, a charge coupled device or an active pixel sensor. Sensor 16 may be attached to a unit that decodes the data.

The embodiments of the method and system of the present invention alter or modify the basic holographic system 10 by using an irradiance-tailoring (e.g., optical) element, and changing the irradiance profile of the modulated object beam by, for example, imparting motion to the irradiance-tailoring element, the holographic recording medium, or both during the recording process either between exposures or during and between exposures. Alternatively, a fixed or stationary irradiance-tailoring (e.g., optical) element whose spatial (e.g., optical) phase profile is reconfigured (e.g., periodically) through, for example, control signals, may be employed in modified system 10 to achieve the same or similar irradiance-tailoring benefits. This imparted motion, or by dynamic altering of the phase profile of a stationary/fixed irradiance-tailoring (e.g., optical) element significantly reduces, for example, the fixed-pattern autocorrelations arising from undesired irradiance or intensity concentrations in the object beam, and thereby minimizes the effects of this fixed-pattern noise buildup from occurring in the holographic recording medium. The slight shift of the irradiance pattern that is created by the various embodiments of the method and system of the present invention, for example, between recording each hologram, or any number of holograms, results in a reduction of the pattern's strength, and consequently far more holograms of higher quality may be combined in a single location/volume of the holographic recording medium.

The various embodiments of the present invention are illustrated by reference to the drawings. Referring to FIGS. 2-6, five schematic designs of alternative embodiments of the method and system of the present invention are shown.

Figure 2:
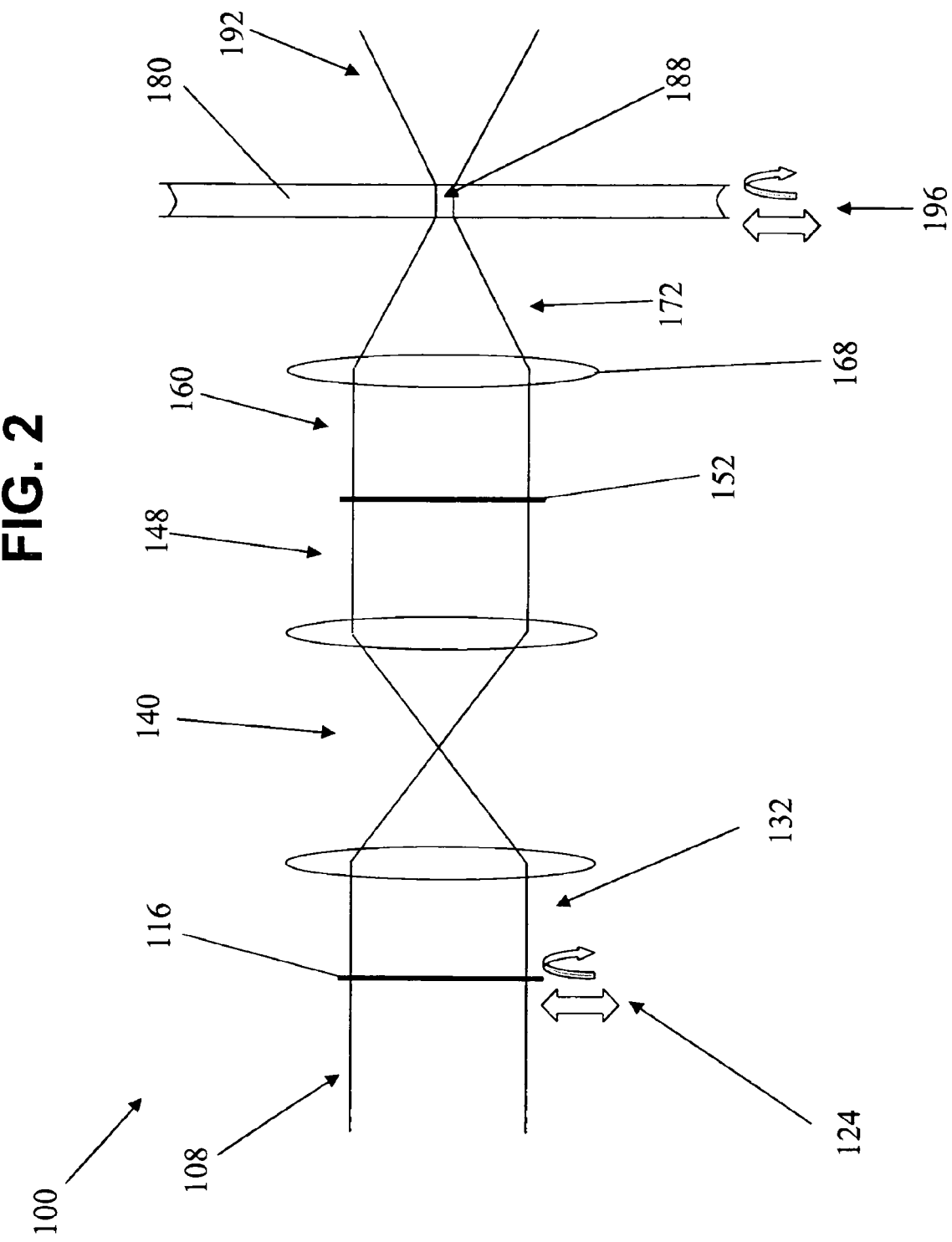
FIG. 2 shows an embodiment of a holographic recording system according to the present invention wherein the object beam transmitted or reflected by the irradiance-tailoring (e.g., optical) element is imaged onto a separate data modulator.

FIG. 2 shows a schematic of one such design of a holographic recording system, indicated generally as 100. As generally shown by the schematic in FIG. 2, in system 100, the object beam image from the data modulator (either transmissive or reflective in nature) may be focused onto or into the holographic recording medium by a storage lens (also referred to sometimes as a Fourier Transform lens). In this design, the irradiance-tailoring (e.g., optical) element is provided separately from and, in transmission/reflection sequence, before the data modulator. To match the modulator imaging condition, an imaging telescope may be used to relay the image from the irradiance-tailoring element onto the data modulator. The size of the irradiance-tailoring (e.g., optical) element is slightly larger than the data modulator so that motion can be imparted to the irradiance-tailoring (e.g., optical) element while still fully encompassing the object beam. This design provides the most condensed, volume-minimized recording regime, as well as the option to impart motion to the irradiance-tailoring element independently from the data modulator.

Referring to the schematic design in FIG. 2 more specifically and in greater detail, system 100 comprises an input object beam (in some embodiments a collimated input beam) indicated as 108, that may pass through (transmissive) or be reflected by (reflective) an irradiance-tailoring optical element in the form of, for example, a caustic-shaping optical element, indicated as 116. As represented by the symbols, collectively indicated as 124, this optical element 116 may be subjected to either linear and/or rotational motion, for example, by linear or rotary stages driven, for example, by stepper (discrete) or DC-servo motors (continuous), or may have its phase profile or irradiance pattern changed or reconfigured (e.g., periodically) while in a stationary or fixed position, to provide irradiance-tailoring benefits. The object beam, indicated as 132, that is phase or spatially shifted by element 116 is then spatially mapped (e.g., relayed) by, for example, a standard (e.g., a 1:1 ratio) imaging telescope 140 as beam 148 onto a data modulator (either transmissive or reflective) such as a spatial light modulator (SLM), indicated as 152, so as to achieve the imaging condition of SLM 152 as may be needed or appropriate for recording. A modulated beam, indicated as 160, from SLM 152 is then focused by a storage lens (e.g., a Fourier Transform lens) 168 as a converging cone-shaped focused data beam 172 into a holographic recording medium 180 at a focal point 188 of data beam 172 (e.g., at the middle of the thickness of medium 180), and then expands as a diverging cone-shaped beam 192. As represented by the motion symbols, collectively indicated as 196, medium 180 may also be subjected to linear and/or rotational motion to provide irradiance-tailoring benefits.

Figure 3:
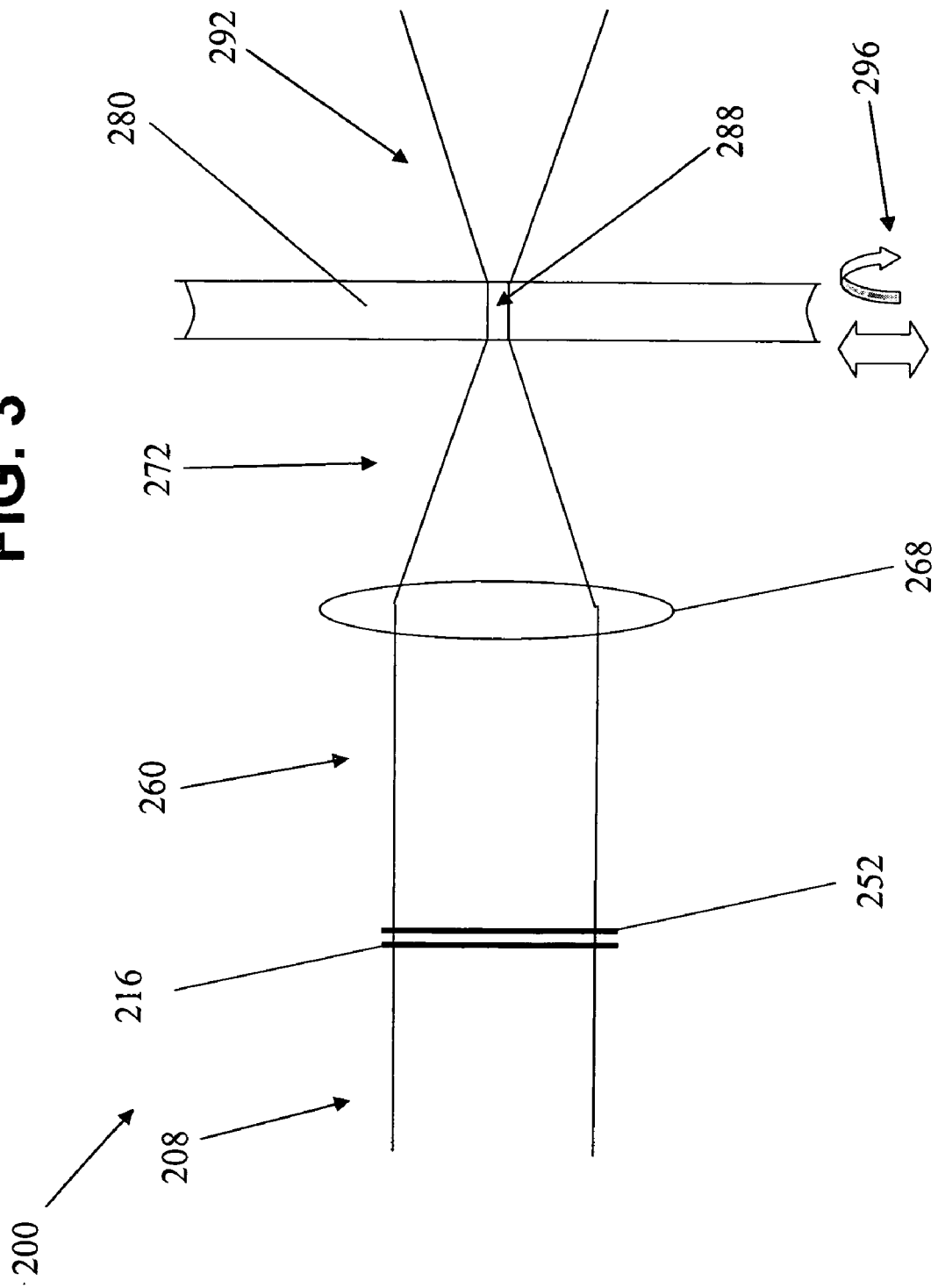
FIG. 3 shows another embodiment of a holographic recording system according to the present invention wherein the irradiance-tailoring (e.g., optical) element is combined with the data modulator into a single unit or assembly.

FIG. 3 shows a schematic of an alternative design of a holographic recording system, indicated generally as 200. As generally shown by the schematic in FIG. 3, system 200 combines the irradiance-tailoring (e.g., optical) element (either transmissive or reflective in nature) with the data modulator (either reflective or transmissive in nature). Once the object beam is transmitted/reflected from the data modulator, system 200 may be the same/similar to system 100 in terms of, for example, focusing the modulated beam with a storage lens onto or into the holographic recording medium, etc.

Because the irradiance-tailoring (e.g., optical) element is combined with the data modulator, motion (linear and/or rotational) can be imparted only to the holographic recording medium to provide irradiance-tailoring benefits, or alternatively the phase profile of the irradiance-tailoring (e.g., optical) element may be reconfigured (e.g., periodically) to provide these irradiance tailoring benefits.

Referring to the schematic design in FIG. 3 more specifically and in greater detail, system 200 comprises an input object beam (in some embodiments a collimated input beam), indicated as 208 that is projected onto a stationary or fixed irradiance-tailoring optical element in the form of, for example, a caustic-shaping optical element, indicated as 216, that is combined with a data modulator such as a spatial light modulator (SLM), indicated as 252. Element 216 and SLM 252 comprise a single unit or assembly wherein element 216 and SLM 252 are often both transmissive, or element 216 or SLM 252 may be reflective. A modulated beam, indicated as 260, from SLM 252 is then focused by a storage lens (e.g., Fourier Transform lens) 268 as a converging cone-shaped focused data beam 272 into the holographic recording medium 280 at a focal point 288 of data beam 272 (e.g., at the middle of the thickness of medium 280), and then expands as a diverging cone-shaped beam, indicated by 292. As represented by the motion symbols, collectively indicated as 296, medium 280 may be subjected to linear and/or rotational motion to provide irradiance-tailoring benefits. If medium 280 is not subjected to linear and/or rotational motion, element 216 may alternatively have its phase profile or irradiance pattern changed or reconfigured (e.g., periodically) to provide the irradiance-tailoring benefits. Additionally, any combination of linear and/or rotational motion imparted to medium 280 with a (e.g., periodic) change or reconfiguration of element 216's phase profile or irradiance pattern may be used in system 200 to provide similar irradiance-tailoring benefits.

Figure 4:
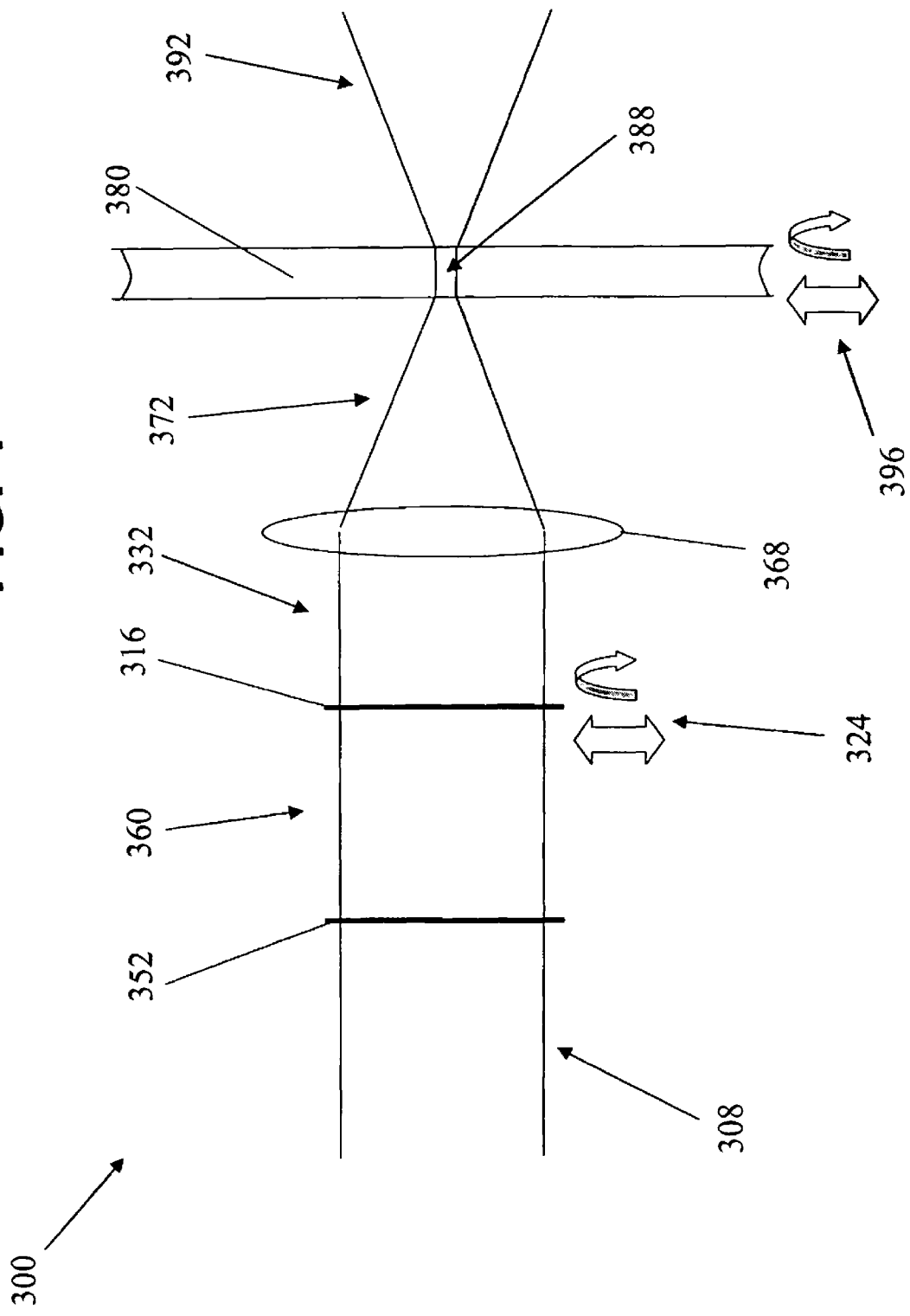
FIG. 4 shows another embodiment of a holographic recording system according to the present invention wherein the irradiance-tailoring (e.g., optical) element is separate from and positioned (in transmission/reflection sequence) after the data modulator.

FIG. 4 shows a schematic of another alternative design of a holographic recording system, indicated generally as 300. As generally shown by the schematic in FIG. 4, system 300 is similar to system 100 but with the irradiance-tailoring element (either transmissive or reflective in nature) being positioned (in transmission/reflection sequence) after the data modulator (either transmissive or reflective in nature), with the resulting beam then being focused, for example, onto or into the holographic recording medium by a storage lens, etc. Like system 100, system 300 provides the option to impart motion to the irradiance-tailoring element independently from the data modulator. Unlike system 100, the irradiance-tailoring optical element of system 300 need not be located at the image plane of the storage lens, i.e., an imaging telescope 140 is not required.

Referring to the schematic design in FIG. 4 more specifically and in greater detail, system 300 comprises an input object beam (in some embodiments a collimated input beam), indicated as 308, that may pass through (transmissive) or be reflected by (reflective) a data modulator such as a spatial light modulator (SLM), indicated as 352, and may then be transmitted or reflected as modulated beam 360 by an irradiance-tailoring optical element in the form of, for example, a caustic-shaping optical element indicated as 316. As represented by the symbols, collectively indicated as 324, this optical element 316 may be subjected to either linear and/or rotational motion, or may have its phase profile or irradiance pattern changed or reconfigured (e.g., periodically) while in a stationary or fixed position, to provide irradiance-tailoring benefits. The shifted and modulated object beam, indicated as 332, that is projected from optical element 316 is then focused by a storage lens (e.g., a Fourier Transform lens) 368 as a converging cone-shaped focused data beam 372 into the holographic recording medium 380 at a focal point 388 of data beam 372 (e.g., at the middle of the thickness of medium 380), and then expands as a diverging cone-shaped beam, indicated by 392. As represented by the motion symbols, collectively indicated as 396, medium 380 may also be subjected to linear and/or rotational motion to provide irradiance-tailoring benefits.

Figure 5:
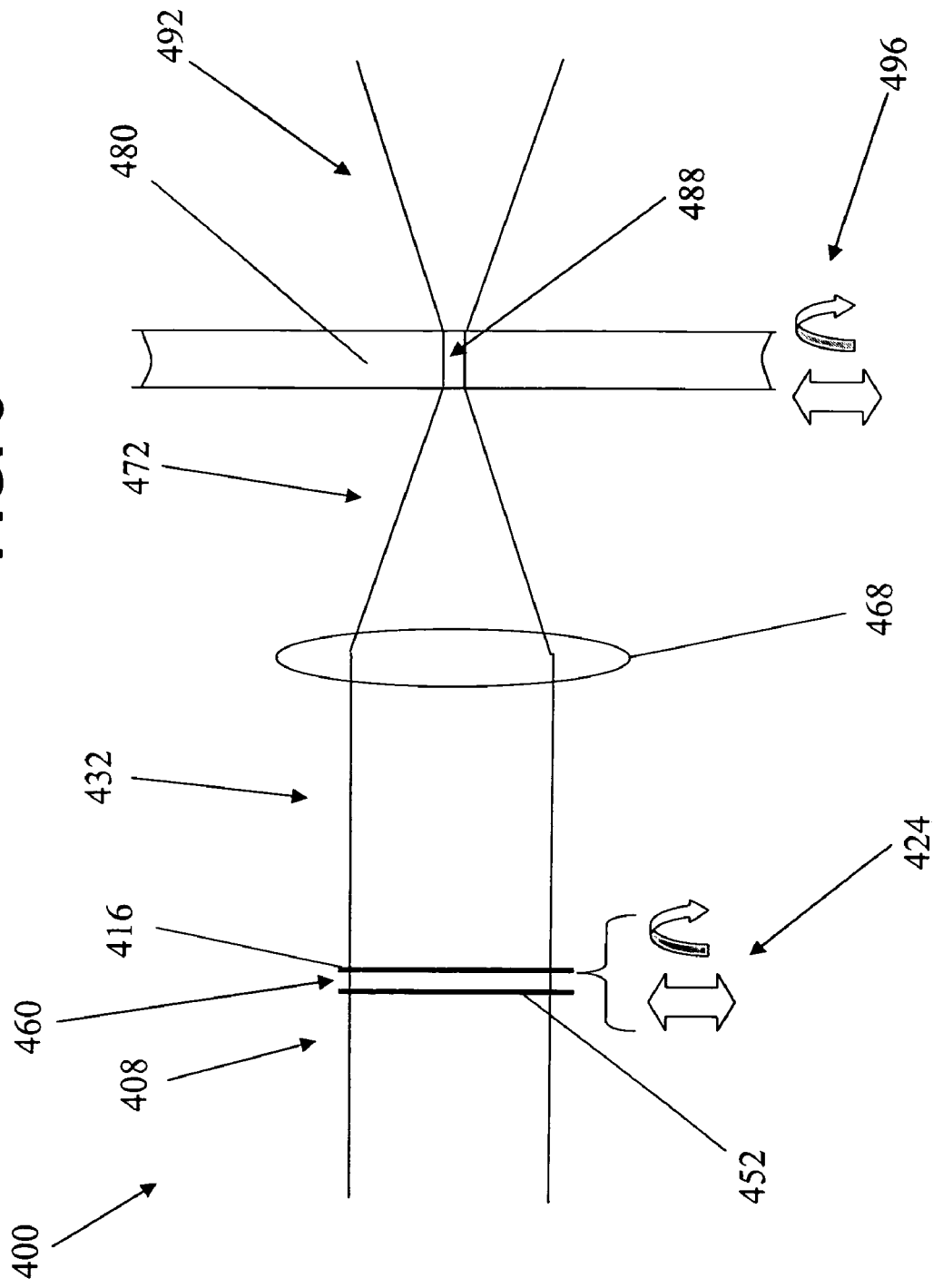
FIG. 5 shows another embodiment of a holographic recording system according to the present invention wherein the irradiance-tailoring (e.g., optical) element is positioned at the same plane as the data modulator.

FIG. 5 shows a schematic of another alternative design of a holographic recording system, indicated generally as 400. As generally shown by the schematic in FIG. 5, system 400 is similar to system 100 but with the irradiance-tailoring element (either transmissive or reflective in nature) being positioned (in transmission/reflection sequence) at the same plane as the data modulator (either transmissive or reflective in nature), with the resulting beam then being focused, for example, onto or into the holographic recording medium by a storage lens, etc. Like system 100, system 400 provides the option to impart motion to the irradiance-tailoring element independently from the data modulator. Unlike system 100, the irradiance-tailoring optical element of system 400 is located at the image plane of the storage lens, i.e., an imaging telescope 140 is not required. One benefit of this design is that read-out of the data is independent of the position of the irradiance-tailoring element.

Referring to the schematic design in FIG. 5 more specifically and in greater detail, system 400 comprises an input object beam (in some embodiments a collimated input beam), indicated as 408, that may pass through (transmissive) or be reflected by (reflective) a data modulator such as a spatial light modulator (SLM), indicated as 452, and may then be transmitted or reflected as modulated beam 460 by an irradiance-tailoring optical element in the form of, for example, a caustic-shaping optical element, indicated as 416. As represented by the symbols, collectively indicated as 424, this optical element 416 may be subjected to either linear and/or rotational motion, or may have its phase profile or irradiance pattern changed or reconfigured (e.g., periodically) while in a stationary or fixed position, to provide irradiance-tailoring benefits. The shifted and modulated object beam, indicated as 432, that is projected from optical element 416 is then focused by a storage lens (e.g., a Fourier Transform lens) 468 as a converging cone-shaped focused data beam 472 into the holographic recording medium 480 at a focal point 488 of data beam 472 (e.g., at the middle of the thickness of medium 480), and then expands as a diverging cone-shaped beam, indicated by 492. As represented by the motion symbols, collectively indicated as 496, medium 480 may also be subjected to linear and/or rotational motion to provide irradiance-tailoring benefits.

Figure 6:
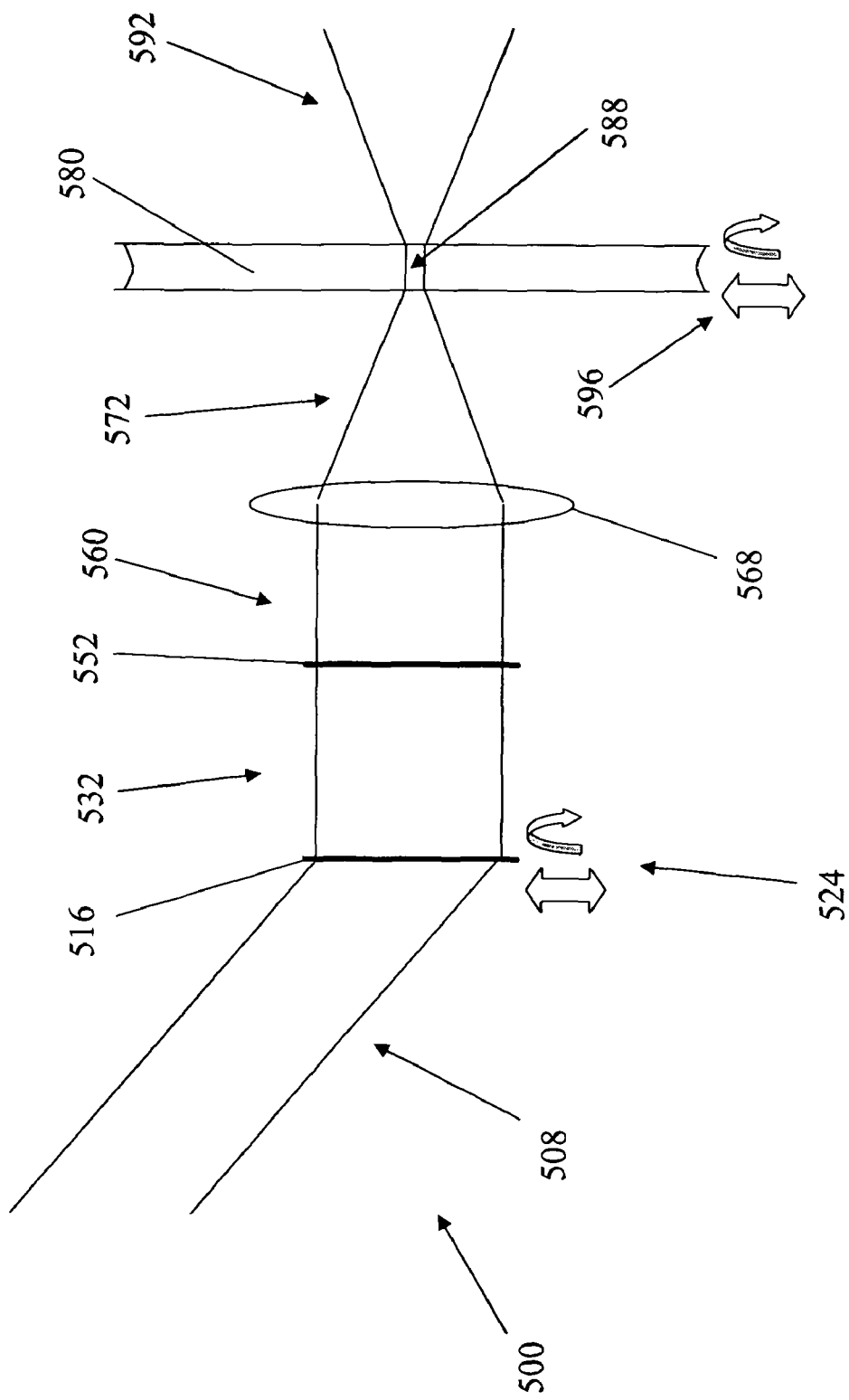
FIG. 6 shows another embodiment of a holographic recording system according to the present invention wherein the irradiance-tailoring element is a holographic optical element (HOE).

FIG. 6 shows another alternative design of a holographic recording system, indicated generally as 500. As generally shown by the schematic in FIG. 6, system 500 is similar to system 400, but with a holographic optical element (HOE) acting as the irradiance-tailoring element. The HOE may be fabricated to possess the irradiance-tailoring characteristics of the optical element of FIGS. 2, 3, and 5, but outside of the plane of the data modulator. An object beam (e.g., a collimated, Bragg-matched object beam) intersects the HOE (either transmissive or reflective in nature) thereby accurately reproducing the desired irradiance-tailoring properties at the plane of the data modulator. The size of the HOE is slightly larger than the data modulator so that motion can be imparted to the HOE while still fully encompassing the object beam. This design provides a condensed, volume-minimized recording regime (i.e., like that of system 100), as well as the option to impart motion to the HOE independently from the data modulator.

Referring to the schematic design in FIG. 6 more specifically and in greater detail, system 500 comprises an input object beam in the form of a collimated, Bragg-matched input object beam, indicated as 508, that may pass through (transmissive) or be reflected by (reflective) an irradiance-tailoring element in the form of a holographic optical element (HOE), indicated as 516. As represented by the symbols, collectively indicated as 524, HOE 516 may be subjected to either linear and/or rotational motion to provide irradiance-tailoring benefits. The object beam, indicated as 532, that is phase or spatially shifted by HOE 516 may then be spatially mapped (e.g., relayed) onto a data modulator (either transmissive or reflective), such as a spatial light modulator (SLM), indicated as 552, so as to satisfy the imaging condition of SLM 552 needed or appropriate for recording. A modulated beam, indicated as 560, from SLM 552 is then focused by a storage lens (e.g., a Fourier Transform lens) 568 as a converging cone-shaped focused data beam 572 onto the holographic recording medium 580 at a focal point 588 of data beam 572 (e.g., at the middle of the thickness of medium 580), and then expands as a diverging cone-shaped beam 592. As represented by the motion symbols, collectively indicated as 596, medium 580 may also be subjected to linear and/or rotational motion to provide irradiance-tailoring benefits.

It should be appreciated that the embodiments illustrated in FIGS. 2 through 6 are provided to illustrate the teachings of the present invention. Alterations or modification within the skill of the art of the embodiments in FIGS. 2 through 6 are considered within the scope of the present invention, so long as these alterations or modifications operate in a same or similar manner, way, function, etc., achieve the same or similar benefits, results, effects, etc.

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A method comprising:
   (1) providing a modulated data beam having an irradiance profile, wherein the modulated data beam is formed by contacting an object beam with an irradiance-tailoring element and a data modulator, and wherein the modulated data beam causes an accumulation of irradiance concentrations when a plurality of holograms are multiplexed into a same or similar volume of a holographic recording medium to thereby increase fixed-pattern noise buildup; and
   (2) changing the irradiance profile of the modulated data beam to reduce the accumulation of irradiance concentrations when multiplexing the plurality of holograms into the same or similar volume to thereby minimize the effects of fixed-pattern noise buildup from occurring in the same or similar volume when the plurality of holograms are multiplexed into the same or similar volume, wherein step (2) is accomplished by imparting motion to an irradiance-tailoring element to thereby alter the irradiance profile of the modulated data beam prior to the modulated data beam passing through a storage lens that focuses the modulated data beam into the holographic recording medium,
   wherein the motion is orthogonal to an optical axis of a portion of the object beam that passes through the irradiance-tailoring element, and
   wherein the irradiance-tailoring element is a holographic optical element.

2. The method of claim 1, wherein the irradiance-tailoring element is a caustic-shaping optic element.

3. The method of claim 1, wherein the motion in step (2) is imparted continuously.

4. The method of claim 1, wherein the irradiance profile of the data beam is altered prior to the data being modulated.

5. The method of claim 1, wherein the effects of fixed-pattern noise buildup minimized in step (2) are fixed-pattern autocorrelations.

6. A method comprising:
   (1) providing a modulated data beam having an irradiance profile, wherein the modulated data beam is formed by contacting an object beam with an irradiance-tailoring element and a data modulator, and wherein the modulated data beam causes an accumulation of irradiance concentrations when a plurality of holograms are multiplexed into a same or similar volume of a holographic recording medium to thereby increase fixed-pattern noise buildup; and
   (2) changing the irradiance profile of the modulated data beam to reduce the accumulation of irradiance concentrations when multiplexing the plurality of holograms into the same or similar volume to thereby minimize the effects of fixed-pattern noise buildup from occurring in the same or similar volume when the plurality of holograms are multiplexed into the same or similar volume, wherein step (2) is accomplished by imparting motion to an irradiance-tailoring element to thereby alter the irradiance profile of the modulated data beam prior to the modulated data beam passing through a storage lens that focuses the modulated data beam into the holographic recording medium,
   wherein the motion is orthogonal to an optical axis of a portion of the object beam that passes through the irradiance-tailoring element, and
   wherein the irradiance-tailoring element comprises random non-linear features.

7. The method of claim 6, wherein the effects of fixed-pattern noise buildup minimized in step (2) are fixed-pattern autocorrelations.

8. The method of claim 6, wherein the irradiance-tailoring element is a caustic-shaping optic element.

9. The method of claim 6, wherein the motion in step (2) is imparted continuously.

10. The method of claim 6, wherein the irradiance profile of the data beam is altered prior to the data beam being modulated.

11. A method comprising:
   (1) contacting an object beam with an irradiance-tailoring element and a data modulator to thereby provide a modulated data beam having an irradiance profile, wherein the modulated data beam causes an accumulation of irradiance concentrations when a plurality of holograms are multiplexed into a same or similar volume of a holographic recording medium to thereby increase fixed-pattern noise buildup;
   (2) relaying the modulated data beam so as to interfere with a reference beam to thereby form at least one hologram in the same or similar volume; and (3) changing the irradiance profile of the relayed modulated data beam after forming the at least one hologram to reduce the accumulation of irradiance concentrations when multiplexing a plurality of holograms into the same or similar volume to thereby minimize the effects of fixed-pattern noise buildup from occurring in the same or similar volume when the plurality of holograms are multiplexed into the same or similar volume, wherein step (3) is accomplished by imparting motion to the irradiance-tailoring element to thereby alter the irradiance profile of the modulated data beam prior to the modulated data beam passing through a storage lens that focuses the modulated data beam into the holographic recording medium, wherein the motion is orthogonal to an optical axis of a portion of the object beam that passes through the irradiance-tailoring element, and wherein the irradiance-tailoring element is a holographic optical element.

12. The method of claim 11, wherein the irradiance-tailoring element is a caustic-shaping optic element.

13. The method of claim 11, wherein the motion in step (3) is imparted continuously.

14. The method of claim 11, wherein the irradiance profile of the data beam is altered prior to the data beam being modulated.

15. The method of claim 11, wherein the effects of fixed-pattern noise buildup minimized in step (3) are fixed-pattern autocorrelations.

16. A method comprising:
   (1) contacting an object beam with an irradiance-tailoring element and a data modulator to thereby provide a modulated data beam having an irradiance profile, wherein the modulated data beam causes an accumulation of irradiance concentrations when a plurality of holograms are multiplexed into a same or similar volume of a holographic recording medium to thereby increase fixed-pattern noise buildup;
   (2) relaying the modulated data beam so as to interfere with a reference beam to thereby form at least one hologram in the same or similar volume; and
   (3) changing the irradiance profile of the relayed modulated data beam after forming the at least one hologram to reduce the accumulation of irradiance concentrations when multiplexing a plurality of holograms into the same or similar volume to thereby minimize the effects of fixed-pattern noise buildup from occurring in the same or similar volume when the plurality of holograms are multiplexed into the same or similar volume, wherein step (3) is accomplished by imparting motion to the irradiance-tailoring element to thereby alter the irradiance profile of the modulated data beam prior to the modulated data beam passing through a storage lens that focuses the modulated data beam into the holographic recording medium, wherein the motion is orthogonal to an optical axis of a portion of the object beam that passes through the irradiance-tailoring element, and wherein the irradiance-tailoring element comprises random non-linear features.

17. The method of claim 16, wherein the irradiance profile of the data beam is altered prior to the data beam being modulated.

18. The method of claim 16, wherein the effects of fixed-pattern noise buildup minimized in step (3) are fixed-pattern autocorrelations.

19. The method of claim 16, wherein the irradiance-tailoring element is a caustic-shaping optic element.

20. The method of claim 16, wherein the motion in step (3) is imparted continuously.

21. A system comprising:
   an irradiance-tailoring element;
   a data modulator;
   an object beam contacting the irradiance-tailoring element and the data modulator to provide a modulated data beam having an irradiance profile, wherein the modulated data beam causes an accumulation of irradiance concentrations when a plurality of holograms are multiplexed into a same or similar volume of a holographic recording medium to thereby increase fixed-pattern noise buildup; and
   means for changing the irradiance profile of the modulated data beam to reduce the accumulation of irradiance concentrations when multiplexing the plurality of holograms into the same or similar volume to thereby minimize the effects of fixed-pattern noise buildup from occurring in the same or similar volume when the plurality of holograms are multiplexed into the same or similar volume, wherein the irradiation profile changing means comprises means for imparting motion to the irradiance-tailoring element to thereby alter the irradiance profile of the modulated data beam prior to the modulated data beam passing through a storage lens that focuses the modulated data beam into the holographic recording medium, wherein the motion is orthogonal to an optical axis of a portion of the object beam that passes through the irradiance-tailoring element, and wherein the irradiance-tailoring element is a holographic optical element.

22. The system of claim 21, wherein the irradiance-tailoring element is a caustic-shaping optical element.

23. The system of claim 21, wherein the motion imparting means imparts motion continuously.

24. A system comprising:
   an irradiance-tailoring element;
   a data modulator;
   an object beam contacting the irradiance-tailoring element and the data modulator to provide a modulated data beam having an irradiance profile, wherein the modulated data beam causes an accumulation of irradiance concentrations when a plurality of holograms are multiplexed into a same or similar volume of a holographic recording medium to thereby increase fixed-pattern noise buildup; and
   means for changing the irradiance profile of the modulated data beam to reduce the accumulation of irradiance concentrations when multiplexing the plurality of holograms into the same or similar volume to thereby minimize the effects of fixed-pattern noise buildup from occurring in the same or similar volume when the plurality of holograms are multiplexed into the same or similar volume, wherein the irradiation profile changing means comprises means for imparting motion to the irradiance-tailoring element to thereby alter the irradiance profile of the modulated data beam prior to the modulated data beam passing through a storage lens that focuses the modulated data beam into the holographic recording medium, wherein the motion is orthogonal to an optical axis of a portion of the object beam that passes through the irradiance-tailoring element, and wherein the irradiance-tailoring element comprises random non-linear features.

25. The system of claim 24, wherein the irradiance-tailoring element is a caustic-shaping optical element.

26. The system of claim 24, wherein the motion imparting means imparts motion continuously.

27. A holographic recording system comprising:
an irradiance-tailoring element;
a data modulator;
an object beam contacting the irradiance-tailoring element and the data modulator to provide a modulated data beam having an irradiance profile;
a holographic recording medium, wherein the modulated data beam causes an accumulation of irradiance concentrations when a plurality of holograms are multiplexed into a same or similar volume of the holographic recording medium to thereby increase fixed-pattern noise buildup;
means for relaying the modulated data beam so as to interfere with a reference beam to thereby form at least one hologram in the same or similar volume; and
means for changing the irradiance profile of the relayed data beam after forming the at least one hologram to reduce the accumulation of irradiance concentrations when multiplexing the plurality of holograms into the same or similar volume to thereby minimize the effects of fixed-pattern noise buildup from occurring in the same or similar volume when the plurality of holograms are multiplexed into the same or similar volume, wherein the irradiation profile changing means comprises means for imparting motion to the irradiance-tailoring element to thereby alter the irradiance profile of the modulated data beam prior to the modulated data beam passing through a storage lens that focuses the modulated data beam into the holographic recording medium,
wherein the motion is orthogonal to an optical axis of a portion of the object beam that passes through the irradiance-tailoring element, and
wherein the irradiance-tailoring element is a holographic optical element.

28. The system of claim 27, wherein the irradiance-tailoring element is a caustic-shaping optic element.

29. The system of claim 27, wherein the motion imparting means imparts motion continuously.

30. A holographic recording system comprising:
an irradiance-tailoring element;
a data modulator;
an object beam contacting the irradiance-tailoring element and the data modulator to provide a modulated data beam having an irradiance profile;
a holographic recording medium, wherein the modulated data beam causes an accumulation of irradiance concentrations when a plurality of holograms are multiplexed into a same or similar volume of the holographic recording medium to thereby increase fixed-pattern noise buildup;
means for relaying the modulated data beam so as to interfere with a reference beam to thereby form at least one hologram in the same or similar volume; and
means for changing the irradiance profile of the relayed data beam after forming the at least one hologram to reduce the accumulation of irradiance concentrations when multiplexing the plurality of holograms into the same or similar volume to thereby minimize the effects of fixed-pattern noise buildup from occurring in the same or similar volume when the plurality of holograms are multiplexed into the same or similar volume, wherein the irradiation profile changing means comprises means for imparting motion to the irradiance-tailoring element to thereby alter the irradiance profile of the modulated data beam prior to the modulated data beam passing through a storage lens that focuses the modulated data beam into the holographic recording medium,
wherein the motion is orthogonal to an optical axis of a portion of the object beam that passes through the irradiance-tailoring element, and
wherein the irradiance-tailoring element comprises random non-linear features.

31. The system of claim 30, wherein the irradiance-tailoring element is a caustic-shaping optic element.

32. The system of claim 30, wherein the motion imparting means imparts motion continuously.

33. A method comprising:
(1) providing a modulated data beam having an irradiance profile, wherein the modulated data beam is formed by contacting an object beam with an irradiance-tailoring element and a data modulator, and wherein the modulated data beam causes an accumulation of irradiance concentrations when a plurality of holograms are multiplexed into a same or similar volume of a holographic recording medium to thereby increase fixed-pattern noise buildup; and
(2) changing the irradiance profile of the modulated data beam to reduce the accumulation of irradiance concentrations when multiplexing the plurality of holograms into the same or similar volume to thereby minimize the effects of fixed-pattern noise buildup from occurring in the same or similar volume when the plurality of holograms are multiplexed into the same or similar volume, wherein step (2) is accomplished by imparting motion to an irradiance-tailoring element to thereby alter the irradiance profile of the modulated data beam prior to the modulated data beam passing through a storage lens that focuses the modulated data beam into the holographic recording medium,
wherein the motion is orthogonal to an optical axis of a portion of the object beam that passes through the irradiance-tailoring element, and
wherein the data beam is modulated prior to the irradiance profile of the data beam being altered.

34. The method of claim 33, wherein the irradiance-tailoring element is a caustic-shaping optic element.

35. The method of claim 33, wherein the motion in step (2) is imparted continuously.

36. A method comprising:
(1) contacting an object beam with an irradiance-tailoring element and a data modulator to thereby provide a modulated data beam having an irradiance profile, wherein the modulated data beam causes an accumulation of irradiance concentrations when a plurality of holograms are multiplexed into a same or similar volume of a holographic recording medium to thereby increase fixed-pattern noise buildup;
(2) relaying the modulated data beam so as to interfere with a reference beam to thereby form at least one hologram in the same or similar volume; and
(3) changing the irradiance profile of the relayed modulated data beam after forming the at least one hologram to reduce the accumulation of irradiance concentrations when multiplexing a plurality of holograms into the same or similar volume to thereby minimize the effects of fixed-pattern noise buildup from occurring in the same or similar volume when the plurality of holograms are multiplexed into the same or similar volume, wherein step (3) is accomplished by imparting motion to the irradiance-tailoring element to thereby alter the irradiance profile of the modulated data beam prior to the modulated data beam passing through a storage lens that focuses the modulated data beam into the holographic recording medium, wherein the motion is orthogonal to an optical axis of a portion of the object beam that passes through the irradiance-tailoring element, and wherein the data beam is modulated prior to the irradiance profile of the data beam being altered.

37. The method of claim 36, wherein the irradiance-tailoring element is a caustic-shaping optic element.

38. The method of claim 36, wherein the motion in step (3) is imparted continuously.

39. A system comprising:
an irradiance-tailoring element;
a data modulator;
an object beam contacting the irradiance-tailoring element and the data modulator to provide a modulated data beam having an irradiance profile, wherein the modulated data beam causes an accumulation of irradiance concentrations when a plurality of holograms are multiplexed into a same or similar volume of a holographic recording medium to thereby increase fixed-pattern noise buildup; and means for changing the irradiance profile of the modulated data beam to reduce the accumulation of irradiance concentrations when multiplexing the plurality of holograms into the same or similar volume to thereby minimize the effects of fixed-pattern noise buildup from occurring in the same or similar volume when the plurality of holograms are multiplexed into the same or similar volume, wherein the irradiation profile changing means comprises means for imparting motion to the irradiance-tailoring element to thereby alter the irradiance profile of the modulated data beam prior to the modulated data beam passing through a storage lens that focuses the modulated data beam into the holographic recording medium, wherein the motion is orthogonal to an optical axis of a portion of the object beam that passes through the irradiance-tailoring element, and wherein the irradiance-tailoring element is positioned at the same plane as the data modulator.

40. The system of claim 39, wherein the irradiance-tailoring element is a caustic-shaping optical element.

41. The system of claim 39, wherein the motion imparting means imparts motion continuously.

42. A holographic recording system comprising:
an irradiance-tailoring element;
a data modulator;
an object beam contacting the irradiance-tailoring element and the data modulator to provide a modulated data beam having an irradiance profile;
a holographic recording medium, wherein the modulated data beam causes an accumulation of irradiance concentrations when a plurality of holograms are multiplexed into a same or similar volume of the holographic recording medium to thereby increase fixed-pattern noise buildup;

means for relaying the modulated data beam so as to interfere with a reference beam to thereby form at least one hologram in the same or similar volume; and means for changing the irradiance profile of the relayed data beam after forming the at least one hologram to reduce the accumulation of irradiance concentrations when multiplexing the plurality of holograms into the same or similar volume to thereby minimize the effects of fixed-pattern noise buildup from occurring in the same or similar volume when the plurality of holograms are multiplexed into the same or similar volume, wherein the irradiation profile changing means comprises means for imparting motion to the irradiance-tailoring element to thereby alter the irradiance profile of the modulated data beam prior to the modulated data beam passing through a storage lens that focuses the modulated data beam into the holographic recording medium, wherein the motion is orthogonal to an optical axis of a portion of the object beam that passes through the irradiance-tailoring element, and wherein the irradiance-tailoring element is positioned at the same plane as the data modulator.

43. The system of claim 42, wherein the irradiance-tailoring element is a caustic-shaping optic element.

44. The system of claim 42, wherein the motion imparting means imparts motion continuously.

* * * * *